(12) United States Patent
Schützmann et al.

(10) Patent No.: US 8,910,869 B2
(45) Date of Patent: Dec. 16, 2014

(54) METHOD AND APPARATUS FOR CHECKING VALUE DOCUMENTS

(75) Inventors: Jürgen Schützmann, Pfaffenhofen (DE); Elisabeth Paul, Raubling (DE)

(73) Assignee: Giesecke & Devrient GmbH, Munich (DE)

( * ) Notice: Subject to any disclaimer, the term of this patent is extended or adjusted under 35 U.S.C. 154(b) by 79 days.

(21) Appl. No.: 13/703,218

(22) PCT Filed: May 18, 2011

(86) PCT No.: PCT/EP2011/002488
§ 371 (c)(1),
(2), (4) Date: Dec. 10, 2012

(87) PCT Pub. No.: WO2011/054088
PCT Pub. Date: Dec. 15, 2011

(65) Prior Publication Data
US 2013/0082105 A1 Apr. 4, 2013

(30) Foreign Application Priority Data
Jun. 9, 2010 (DE) .......................... 10 2010 023 097

(51) Int. Cl.
*G06K 7/08* (2006.01)
*G07D 7/04* (2006.01)

(52) U.S. Cl.
CPC *G06K 7/087* (2013.01); *G07D 7/04* (2013.01); *G07K 5/00* (2013.01)
USPC .......................................... 235/450; 235/449

(58) Field of Classification Search
CPC .......... G06K 7/084; G06K 7/087; G07D 7/04
USPC ................................. 235/449, 450
See application file for complete search history.

(56) References Cited

U.S. PATENT DOCUMENTS 8,322,505 B2 * 12/2012 Freeman et al. ............... 194/210
8,544,630 B2 * 10/2013 Schutzmann et al. ......... 194/302
(Continued)

FOREIGN PATENT DOCUMENTS

DE        28 34 287 A1      2/1980
DE   10 2004 049 999 A1     4/2006
(Continued)

OTHER PUBLICATIONS

International Search Report for PCT/EP2011/002488, Jul. 22, 2011.
(Continued)

*Primary Examiner* — Daniel St Cyr
(74) *Attorney, Agent, or Firm* — Workman Nydegger

(57) ABSTRACT

A method of checking value documents having a security element with a plurality of magnetic areas, including a high-coercivity magnetic area, a low-coercivity magnetic area and a combined magnetic area, which contains both the high-coercivity and the low-coercivity magnetic material. When all magnetic areas have been magnetized in a first direction, second magnetization is performed, which involves only the low-coercivity magnetic material being remagnetized parallel to the first magnetization in the opposite direction, but the high-coercivity magnetic material remaining oriented in the first direction of magnetization. Next, first magnetic signals from the security element are detected using a first magnetic detector, and second magnetic signals are detected using a second magnetic detector. The magnetic signals are used to identify each magnetic area of the security element as a high-coercivity, a low-coercivity or a combined magnetic area.

14 Claims, 4 Drawing Sheets

(56) References Cited

U.S. PATENT DOCUMENTS

| | | |
|---|---|---|
| 2009/0008922 A1 | 1/2009 | Schutzmann et al. |
| 2009/0020661 A1* | 1/2009 | Ludwig et al. ............... 248/129 |
| 2012/0279101 A1* | 11/2012 | Pretsch et al. ............. 40/299.01 |

FOREIGN PATENT DOCUMENTS

| | | |
|---|---|---|
| EP | 0 428 779 A1 | 5/1991 |
| WO | 2009/090676 A1 | 7/2009 |
| WO | 2009/103352 A1 | 8/2009 |

OTHER PUBLICATIONS

German Search Report for DE 10 2010 023 097.9, dated Mar. 22, 2011.

* cited by examiner

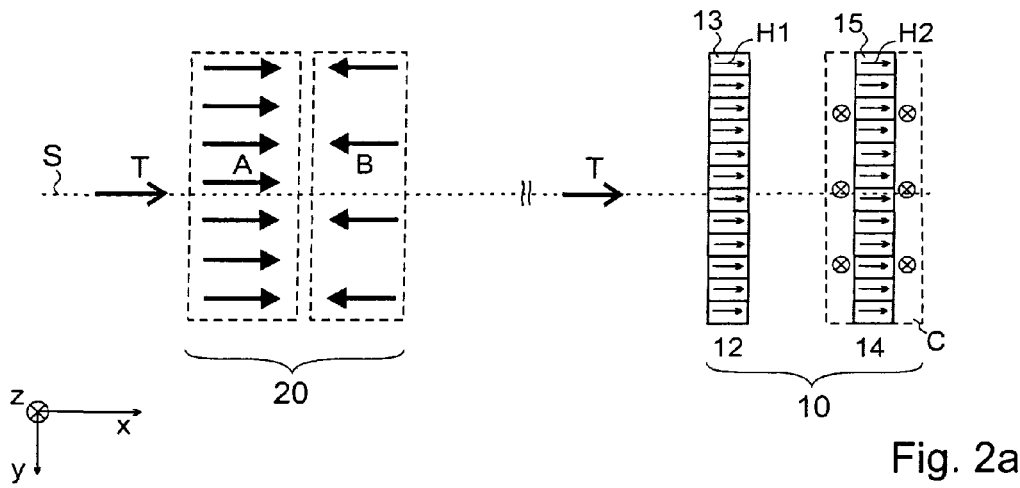
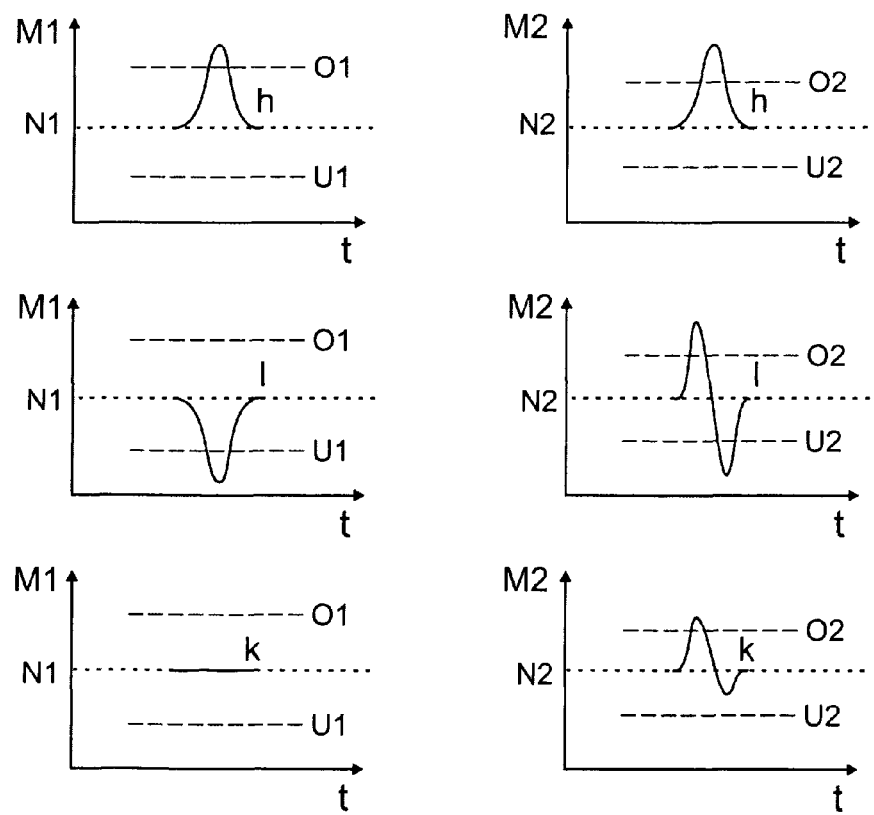
Fig. 2a
Fig. 2b

METHOD AND APPARATUS FOR CHECKING VALUE DOCUMENTS

BACKGROUND OF THE INVENTION

A. Field of the Invention

The invention relates to a method and an apparatus for checking value documents, such as e.g. bank notes, checks, cards, tickets, coupons.

From the prior art it is known to provide value documents with security elements, such as security strips or also security threads, which contain magnetic material. The magnetic material here can be applied onto the security element either continuously or only in certain regions, for example in the form of a coding. For the magnetic coding of a security element there is used for example a certain sequence of magnetic and non-magnetic regions, which is characteristic of the value document. Furthermore, it is known to employ different magnetic materials for a magnetic coding, e.g. with different coercive field strengths. In the hitherto known magnetic codings there are used two differently coercive magnetic materials, of which there are formed two types of magnetic regions which are disposed on the security element.

Further, it is known to automatically check bank notes having security threads, which have a magnetic coding of differently coercive materials. In so doing, the bank notes are transported parallel to the longitudinal direction of the security element, and one after the other first run through a strong magnetic field parallel to the transport direction, which magnetizes both the high-coercive and also the low-coercive magnetic regions along the transport direction. The remaining magnetization is checked by means of an inductive magnetic detector which is sensitive parallel to the transport direction. Then the bank notes run through a weaker magnetic field perpendicular to the transport direction, which aligns only the low-coercive magnetic regions perpendicular to the transport direction, while the high-coercive magnetic regions remain magnetized in the transport direction. Anew, the remaining magnetization is checked by means of an inductive magnetic detector which is sensitive parallel to the transport direction. In so doing, with the first inductive magnetic detector the high- and the low-coercive magnetic regions are detected and with the second inductive magnetic detector only the high-coercive magnetic regions are detected. If the security element, however, also contains combined magnetic regions, which contain the two differently coercive magnetic materials, so that the differently coercive magnetic materials at the same time reach the detection region of the magnetic detector, an overlay of the magnetic signals of the differently coercive magnetic materials is detected. The combined magnetic regions deliver here a reduced magnetic signal whose signal swing lies between that of the high-coercive and that of the low-coercive magnetic regions. A disadvantage of this method is that these combined magnetic regions can be distinguished only with difficulties from the high-coercive and from the low-coercive magnetic regions. Furthermore it is disadvantageous to employ for the magnetic reversal of the low-coercive magnetic regions a magnetic field which is oriented parallel to the transport plane and perpendicular to the transport direction of the value document. Because with the aid of usual magnets such oriented magnetic fields can only be realized with relatively low magnetic field strength.

SUMMARY OF THE INVENTION

The invention is therefore based on the object to carry out the check of the value documents in such a way that the high-coercive, the low-coercive and the combined magnetic regions respectively can be reliably distinguished from each other.

The value document to be checked has a security element with several magnetic regions. The magnetic regions include at least one high-coercive magnetic region of a high-coercive magnetic material with a first coercive field strength and at least one low-coercive magnetic region of a low-coercive magnetic material with a second coercive field strength which is lower than the first coercive field strength, and, optionally, at least one combined magnetic region which has both the high-coercive and the low-coercive magnetic material. The at least one combined magnetic region contains both the high-coercive and the low-coercive magnetic material. The high-coercive and the low-coercive magnetic material of the combined magnetic region are e.g. disposed on each other. Alternatively, the combined magnetic region has the high-coercive and the low-coercive magnetic material in the form of a mixture.

Preferably, the at least one combined magnetic region is configured such that the high-coercive magnetic material of the combined magnetic region and the low-coercive magnetic material of the combined magnetic region have substantially the same remanent flux density. The combined magnetic region contains in particular the same quantity of the high-coercive and of the low-coercive magnetic material. The high- and low-coercive proportions of the at least one combined magnetic region, however, may also deviate from each other, e.g. due to unavoidable print tolerances upon manufacturing of the magnetic regions. Preferably, also the remanent flux densities of the high-coercive magnetic region and of the low-coercive magnetic region are equal. For example, the remanent flux density of the high-coercive magnetic material of the combined magnetic region amounts to half of the remanent flux density of the high-coercive magnetic region. And the remanent flux density of the low-coercive magnetic material of the combined magnetic region amounts to half of the remanent flux density of the low-coercive magnetic region. The at least one combined magnetic region can have a resulting remanent flux density which is equal to the remanent flux density of the high-coercive magnetic region and equal to the remanent flux density of the low-coercive magnetic region. Alternatively, the remanent flux densities of the high-coercive, of the low-coercive and of the combined magnetic region can also be different, however.

For checking the value document, the following steps are carried out: The value document or the security element of the value document is magnetized by a first magnetic field whose magnetic field strength is greater than the first and than the second coercive field strength. The magnetization of the high-coercive magnetic material (both of the high-coercive and of the combined magnetic region) and the magnetization of the low-coercive magnetic material (both of the low-coercive and of the combined magnetic region) here are uniformly aligned in a first magnetization direction. Then the value document or the security element is magnetized by a second magnetic field whose magnetic field strength is lower than the first coercive field strength but is greater than the second coercive field strength. The second magnetic field is oriented such that the magnetization of the low-coercive magnetic material (both of the low-coercive and of the combined magnetic region) is aligned antiparallel to the first magnetization direction. The magnetization of the high-coercive magnetic material (both of the high-coercive and of the combined magnetic region) remains aligned unchanged in the first magnetization direction upon the second magnetization.

In particular, the second magnetic field is oriented antiparallel to the first magnetic field. This is particularly advantageous, because the second magnetic field in this case can be made available by a magnetization device similar to that of the first magnetic field, e.g. by similar magnets. Advantageously, then simply by means of usual magnets there can be realized a relatively great magnetic field strength of the first and of the second magnetic field. The first magnetization direction is oriented for example parallel or antiparallel to the transport direction of the value document. But it can also be oriented differently, e.g. perpendicular to the transport plane of the value document.

After the first and second magnetizing, first magnetic signals of the security element are detected by a first magnetic detector and thereafter second magnetic signals of the security element by a second magnetic detector. The first and the second magnetic signals are analyzed, in order to identify each of the magnetic regions of the security element either as one of the combined magnetic regions or as one of the high-coercive or low-coercive magnetic regions.

Since the magnetic field strength of the second magnetic field is lower than the first coercive field strength, the high-coercive magnetic material is not magnetically reversed by the second magnetic field. The magnetization of the low-coercive magnetic material, however, is aligned antiparallel to the first magnetization direction by the second magnetic field. Therefore, the first magnetic signal of the at least one low-coercive magnetic region differs from the first magnetic signal of the at least one high-coercive magnetic region. For example, the first magnetic signal of the low-coercive magnetic region is substantially inverted in comparison to the first magnetic signal of the high-coercive magnetic region.

Furthermore, the antiparallel magnetization of the low-coercive magnetic material also leads to the fact that the first magnetic signal of the at least one combined magnetic region respectively differs from the first magnetic signals of the high- and low-coercive magnetic regions. The at least one combined magnetic region is magnetized by the second magnetic field in such a way that a resulting magnetization of the at least one combined magnetic region, which arises from the second magnetizing, at least approximatively vanishes. For this purpose, the combined magnetic regions are preferably configured such that the low-coercive magnetic material of the combined magnetic region and the high-coercive magnetic material of the combined magnetic region have at least approximatively the same remanent flux density. When in this case the low-coercive magnetic material of the combined magnetic region is magnetized antiparallel to the high-coercive magnetic material of the combined magnetic region by the second magnetic field, ideally, a vanishing resulting magnetization of the respective combined magnetic region is achieved. By the resulting magnetization of the combined magnetic regions almost vanishing, it is possible for the first magnetic signals of the high-coercive and of the low-coercive magnetic regions to be very reliably distinguished from the first magnetic signals of the combined magnetic regions. It can therefore be derived from the first magnetic signal of the respective magnetic region, whether the respective magnetic region is a high-coercive, a low-coercive or a combined magnetic region.

The exact form of the magnetic signal of the individual magnetic regions depends on the type of the employed magnetic detector as well as on the remanent flux density and on the length of the respective magnetic region. For example, the first and/or second magnetic signal of the high-coercive, of the low-coercive and of the combined magnetic regions can be respectively configured as single peak or double peak.

Upon vanishing resulting magnetization, as it is generated with the combined magnetic regions through the antiparallel second magnetizing, the first magnetic signal of the combined magnetic region has no pronounced peaks and corresponds approximately to a first signal offset of the first magnetic signal.

Before the detection of the second magnetic signals of the security element, a third magnetic field acts on the security element, whose magnetic field strength is greater than the second coercive field strength. The magnetization of the low-coercive magnetic material generated by the second magnetic field is therefore changed by the third magnetic field. The third magnetic field is oriented such that the magnetization of the low-coercive magnetic material is aligned by the third magnetic field in a third magnetization direction which is oriented non-antiparallel to the first magnetization direction. This achieves the result that the magnetization of the low-coercive magnetic material is aligned by the third magnetic field in a different direction than it has been aligned by the second magnetic field. The magnetization of the low-coercive magnetic material is changed by the third magnetic field, before the second magnetic signals are detected. The third magnetic field acts on the security element's section to be detected before the detection of the second magnetic signal of the respective section, in particular before and during the detection of the second magnetic signal of the respective section.

The first magnetic signals of the security element are not detected under the action of the third magnetic field. The third magnetic field thus acts on a security element's section to be detected only after the detection of the first magnetic signal of the respective section and before detection of the second magnetic signal of the respective section. Preferably, the second magnetic signals of the security element are detected under the action of the third magnetic field. Here, the third magnetic field acts on the security element's section to be detected not only before but also during detection of the second magnetic signal of the respective section.

The third magnetic field is oriented such that the magnetization of the low-coercive magnetic material is aligned by the third magnetic field in a third magnetization direction which is oriented non-antiparallel to the first magnetization direction. The magnetization direction of the third magnetic field can be arbitrarily chosen here, as long as it differs from the magnetization direction of the second magnetic field. It can be oriented e.g. parallel, perpendicular or oblique to the first magnetization direction. In an embodiment, the third magnetization direction is equal to the first magnetization direction. In another embodiment, the third magnetization direction is oriented perpendicular to the first magnetization direction and perpendicular to a transport plane of the value document.

In some embodiments, the magnetic field strength of the third magnetic field is greater than the second coercive field strength, but lower than the first coercive field strength. In these cases, by the third magnetic field there is only changed the magnetization of the low-coercive magnetic material (both of the low-coercive magnetic region and the low-coercive proportion of the combined magnetic region), but not the magnetization of the high-coercive magnetic material. Then the magnetization of the high-coercive magnetic material (both of the high-coercive magnetic region and of the high-coercive proportion of the combined magnetic region) thus remains aligned in the first magnetization direction. Through the changed magnetization of the low-coercive magnetic material and the unchanged magnetization of the high-coercive magnetic material the combined magnetic region receives a distinct resulting magnetization (which no longer vanishes). In contrast to the first magnetic signal, the combined magnetic region thus generates a distinct second magnetic signal.

Alternatively, the magnetic field strength of the third magnetic field can also be greater than the first and than the second coercive field strength, so that it exceeds both coercive field strengths. In these cases, by the third magnetic field both the magnetization of the low-coercive and the magnetization of the high-coercive magnetic material is changed. Through the changed magnetization of the low-coercive magnetic material and the changed magnetization of the high-coercive magnetic material the combined magnetic region thus again receives a distinct resulting magnetization (which no longer vanishes). In contrast to the first magnetic signal, the combined magnetic region thus generates also in this case a distinct second magnetic signal.

Each section of the security element, in which the second magnetic detector detects a distinct second magnetic signal, is identified as (high-coercive, low-coercive or combined) magnetic region of the security element. Those sections of the security element, of which there is detected a distinct second magnetic signal, of which the first magnetic detector, however, detects a nearly vanishing first magnetic signal, are identified as combined magnetic regions.

The high-coercive and the low-coercive magnetic regions respectively generate distinct first and distinct second magnetic signals and can be distinguished from each other based on their signal form and/or with the aid of one or several threshold comparisons or by means of other methods. Since the magnetic signals of the high- and low-coercive magnetic regions can be differently configured depending on the type of the employed magnetic detector, also the decision whether a magnetic region is identified as high-coercive or as low-coercive magnetic region depends on the type of the magnetic detector. With some magnetic detectors the first magnetic signal of a high-coercive magnetic region is configured as a positive single peak and the first magnetic signal of a low-coercive magnetic region as a negative single peak. In this case each magnetic region whose first magnetic signal exceeds the upper threshold can be identified as high-coercive magnetic region and each magnetic region whose first magnetic signal undershoots the lower threshold as low-coercive magnetic region. With other magnetic detectors, the first magnetic signal of the high-coercive and of the low-coercive magnetic regions is respectively configured as a double peak, the double peak of the low-coercive magnetic region being configured inversely to the double peak of the high-coercive magnetic region. For distinguishing the high-coercive from the low-coercive magnetic regions, e.g. the signal form of the first magnetic signals can be analyzed.

For identifying the magnetic regions, e.g. a signal processing of the first and second magnetic signals can be carried out, which employs two thresholds with which the respective first and second magnetic signal of the respective magnetic region is compared. The first magnetic signal is compared with a first upper threshold and with a first lower threshold which lies below the first upper threshold. The second magnetic signal is compared with a second upper threshold and with a second lower threshold which lies below the second upper threshold.

With respect to a positive magnetic-signal amplitude, this means that the respective upper threshold lies at a greater magnetic-signal amplitude than the respective lower threshold. The first upper threshold lies above and the first lower threshold lies below a signal offset of the first magnetic signal. The second upper threshold lies above and the second lower threshold lies below a signal offset of the second magnetic signal.

Upon identifying the magnetic regions, a magnetic region whose second magnetic signal exceeds a second upper threshold and/or undershoots a second lower threshold, and whose first magnetic signal neither exceeds a first upper threshold nor undershoots a first lower threshold, is identified as combined magnetic region. A magnetic region whose second magnetic signal exceeds the second upper threshold and/or undershoots the second lower threshold, and whose first magnetic signal exceeds the first upper threshold and/or undershoots the first lower threshold, is identified either as high-coercive or as low-coercive magnetic region. By the first upper and the first lower threshold being disposed on sides of the first signal offset opposing each other, the comparison of the first magnetic signal with these two thresholds leads to a very reliable distinction between the combined magnetic regions and the high- and low-coercive magnetic regions. In order to further optimize the identification of the combined magnetic regions, the first upper and first lower threshold are defined preferably such that the two thresholds have a relatively great distance from each other. The distance amounts to e.g. at least 50%, preferably at least 75% of an average signal swing, which the first magnetic signal of the high-coercive and/or of the low-coercive magnetic regions has relative to the signal offset of the first magnetic signal.

For identifying the magnetic regions, the signal processing of the first and second magnetic signals can also be carried out such that a signal derived from the respective first magnetic signal and/or that a signal derived from the respective second magnetic signal are compared with thresholds. For identifying, there can be alternatively employed also a signal which has been derived from both, i.e. from the first and second magnetic signal, e.g. by a linear combination or formation of the ratio of the first and second magnetic signal of the respective magnetic region. The signal derived from detected first or second magnetic signal is derived e.g. by forming a correlation of the first or second magnetic signal with a base signal which is characteristic for the respective magnetic detector which detects the first or second magnetic signal, or for the individual magneto-sensitive elements thereof, and for the security element to be checked. The derived signal may correspond to e.g. the maximum value of a correlation curve, which is determined for each position along the longitudinal direction of the security element. But also other characteristics of the correlation curve can be used. The derived signal, however, can also be directly the maximum value of the second magnetic signal, which the second magnetic detector, or the individual magneto-sensitive elements thereof, detects at the respective position along the longitudinal direction of the security element. The derived signal can also be the area under the first or second magnetic signal at the respective position along the security element or other characteristics of the first or second magnetic signal or characteristics of the signal which has been derived from the first and second magnetic signal. For identifying the magnetic regions, the respective derived signal, instead of the first and second magnetic signal themselves, is then compared with an upper threshold and a lower threshold. In dependence on the exceeding or undershooting of the two thresholds by the respective first and second magnetic signal, each magnetic region is identified either as combined or as high-coercive or as low-coercive magnetic region.

The upper and/or the lower threshold can be chosen in dependence on the first magnetic signal of the security element, in particular in dependence on a signal swing of the first magnetic signal, which the first magnetic signal has relative to its signal offset. Thus, one can react, quasi automatically, e.g. to transport fluctuations of the value document or to manufacturing-related fluctuations of the quantity of magnetic material in the magnetic regions. The upper threshold and/or the lower threshold can be chosen to be the same for all magnetic regions, so that all second magnetic signals of the magnetic regions are compared with the same upper and with the same lower threshold. This can be chosen dynamically in dependence on the first magnetic signal. If the signal swing of the first magnetic signals of the magnetic regions of the security element is for example on average relatively high or low, then the upper threshold is accordingly increased or reduced.

The length of the individual magnetic regions along the longitudinal direction of the security element can be determined e.g. from the course of the first and/or the second magnetic signal along the longitudinal direction of the security element or from the course of a derived signal which has been derived from the first and/or from the second magnetic signal from the respective magnetic region.

Preferably, by the second magnetic detector also second magnetic signals of one or several soft-magnetic regions of the value document can be detected, which the value document may have outside the security element. For detecting the soft-magnetic regions, the second magnetic signals of the value document are detected also outside the security element, namely under the action of the third magnetic field, which during the detection of the second magnetic signal of the respective soft-magnetic region acts on this. The soft-magnetic regions of the value document, which lie outside the security element, are identified as soft-magnetic regions with the aid of their second magnetic signal, e.g. by comparing the second magnetic signal with one or several thresholds.

For checking the value document, a chosen region of the value document can be checked in locally resolved fashion as to its magnetic properties, e.g. the region of the value document in which the security element is present. In addition, separately therefrom, also a soft-magnetic region of the value document can be checked in locally resolved fashion as to its magnetic properties. Alternatively, the first and second magnetic signals can also be detected in locally resolved fashion over a region enclosing both regions or continuously over the entire value document.

The invention also relates to an apparatus for checking a value document having a security element which has at least one of the above-mentioned high-coercive and/or low-coercive and/or combined magnetic regions. With the aid of this apparatus, a magnetic coding of the security element of high-coercive, low-coercive and combined magnetic regions can be reliably established. The apparatus for checking value documents according to the invention can be configured as an apparatus for value document processing, into which value documents can be input for their checking, or as an apparatus which is provided for installation in such an apparatus.

The apparatus has a first magnetization device for making available a first magnetic field which is configured for the first magnetizing of the high-coercive and of the low-coercive magnetic material of the security element in a first magnetization direction. The magnetic field strength of the first magnetic field employed for the first magnetizing is greater than the first coercive field strength of the high-coercive magnetic material. In addition, the apparatus has a second magnetization device for making available a second magnetic field which is configured for the second magnetizing of the high-coercive and of the low-coercive magnetic material of the security element in a second magnetization direction. The magnetic field strength of the second magnetic field employed for the second magnetizing is greater than the second coercive field strength of the low-coercive magnetic material and lower than the first coercive field strength of the high-coercive magnetic material. The second magnetization direction is oriented antiparallel to a first magnetization direction. The first and the second magnetization device can also be formed, however, by one and the same magnetization device which makes available both the first and the second magnetic field.

In addition, the apparatus has a first magnetic detector for detecting first magnetic signals of the security element and a second magnetic detector for detecting second magnetic signals of the security element. The first and second magnetic detectors are disposed such that upon checking of the value document, for each section of the value document the first and the second magnetic signals are detected only after the first and second magnetizing of the respective section has been carried out. The apparatus has further a third magnetization device for making available the above-mentioned third magnetic field, which is configured such that the third magnetic field, upon checking of the value document, acts on the security element before the detection of the second magnetic signals. The third magnetic field is configured such that it acts, upon checking of the value document, on a security element's section to be detected after the detection of the first magnetic signal of the respective section and before the detection of the second magnetic signal of the respective section. The spatial extension of the third magnetic field is therefore such that it magnetizes the security element already before this is transported into the capture region of the second magnetic detector. The third magnetic field is preferably configured such that the second magnetic signals, upon checking of value document, can be detected under the action of the third magnetic field. In this case, the third magnetic field is configured such that it acts on the security element's section to be detected before and during the detection of the second magnetic signal of the respective section.

The third magnetization device preferably consists of one or several permanent magnets disposed one-sided to the transport path of the value document. This at least one permanent magnet is disposed on that side of the transport path, on which also the second magnetic detector is disposed, no further magnetic material being disposed opposite thereto on the other side of the transport path. By omitting further magnetic material on the side opposing the second magnetic detector, magnetic field fluctuations at the place of the second magnetic detector are avoided, which otherwise could occur through mechanical shocks of the arrangement. Preferably, the at least one permanent magnet and the second magnetic detector are mechanically fixed to each other such that they form a structural unit. For example, for this purpose, the second magnetic detector is potted with the permanent magnet which generates the third magnetic field. A suitable fixing can also be achieved, however, by adhesive bonding, screwing together, etc. Through the mechanical fixing to each other it is achieved that the relative position between the permanent magnet and the second magnetic detector remains stable and mechanical shocks do not cause any disturbances of the second magnetic signals.

The apparatus may further contain a signal processing device for analyzing the first and the second magnetic signals. The signal processing device is adapted to identify and to distinguish from each other the high-coercive, low-coercive and combined magnetic regions with the aid of their first and second magnetic signals, as explained above with respect to the method. The signal processing device is adapted to ascertain at which positions on the security element there are localized magnetic regions of the security element, and to identify these magnetic regions. The signal processing device can be a component of the apparatus. But it can also be a device independent thereof, to which the first and second magnetic signals are transferred.

The first and/or the second magnetic detector have e.g. a certain main sensitivity direction. The main sensitivity direction of the first and/or of the second magnetic detector can be oriented parallel or antiparallel to the first magnetization direction or it can be oriented perpendicular to the first magnetization direction and perpendicular to the transport plane of the value document. The first and the second magnetic detector preferably have the same main sensitivity directions. With respect to the handling of the magnetic detectors it is particularly advantageous to employ for the first and second magnetic detectors two identically constructed magnetic detectors. The third magnetic field is preferably oriented substantially perpendicular to a main sensitivity direction of the second magnetic detector. The first and second magnetic detector can be configured as sensor lines, which respectively have a plurality of magneto-sensitive elements. The first and second magnetic detectors can also be configured as individual magneto-sensitive elements, however. The magneto-sensitive elements of the magnetic detectors can be configured as magneto-resistive elements, e.g. as conventional magneto-resistive elements, GMR, AMR, SdT or spin-valve elements, but there can also be employed inductive elements, Hall elements, etc.

DESCRIPTION OF THE DRAWINGS

Hereinafter the invention will be explained by way of example with reference to the following Figures. There are shown:

FIG. 2a,b a further embodiment, in which the third magnetic field is oriented perpendicular to the transport plane of the value document (FIG. 2a), and schematically the associated magnetic signals of the security element as a function of time t (FIG. 2b), FIG. 3a,b a further embodiment, in which the third magnetic field is oriented parallel to the transport direction of the value document (FIG. 3a), and schematically the associated magnetic signals of the security element as a function of time t (FIG. 3b), FIG. 4a a further embodiment with two magnetic detectors which are oriented perpendicular to the transport direction of the security element and perpendicular to the longitudinal direction of the security element, FIG. 4b a further embodiment with two magnetic detectors which are oriented obliquely to the transport direction of the security element and obliquely to the security element.

DETAILED DESCRIPTION OF EXEMPLARY EMBODIMENTS

Figure 1:
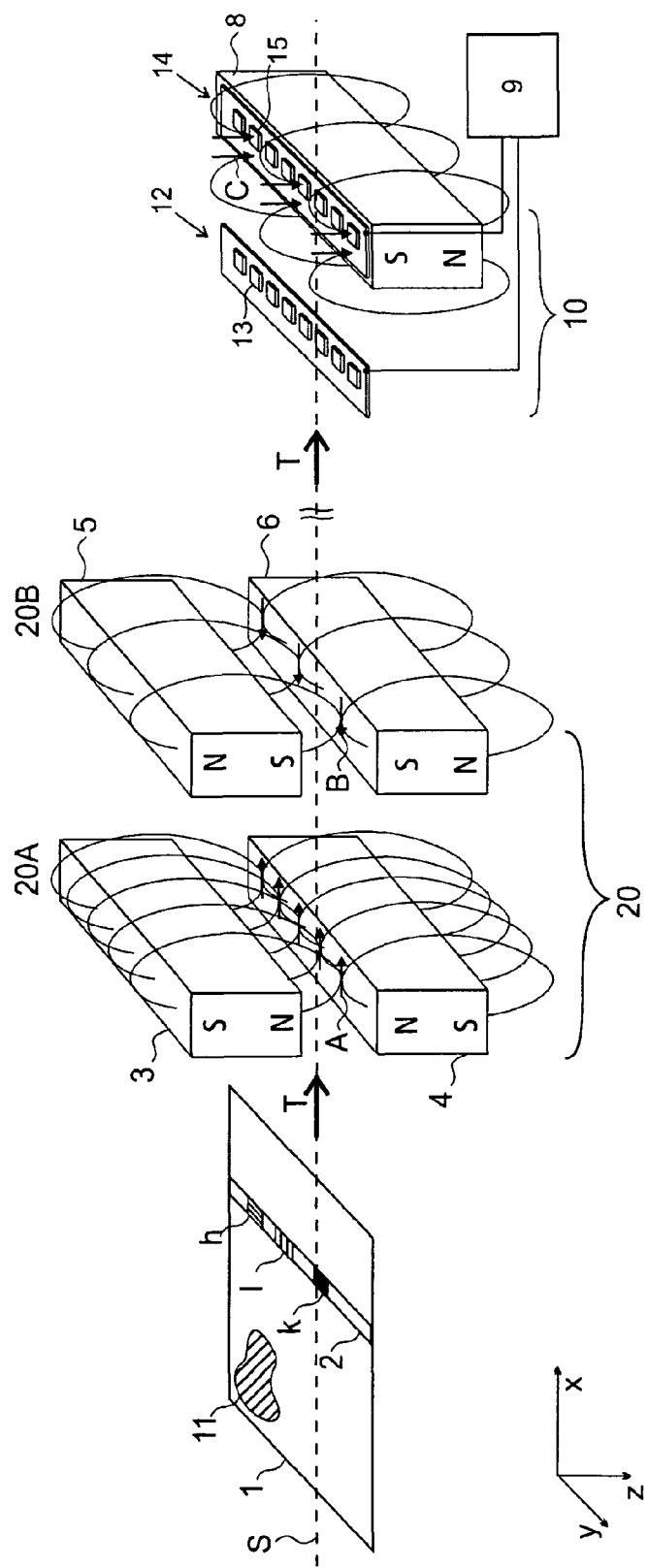
FIG. 1 a first embodiment in a three-dimensional view.

FIG. 1 shows a first embodiment of the apparatus according to the invention. A value document 1 is transported along a transport path S first past an arrangement 20 of two magnetization devices 20A, 20B for making available two magnetic fields A, B and thereafter past a magnetic sensor 10 with two sensor lines 12, 14. The magnetic fields A, B are respectively made available by two mutually opposing magnets 3, 4 and 5, 6, between which the value document 1 is transported through. The poles N, S of the magnets 3, 4 are aligned such that between these a magnetic field A arises parallel to the transport direction T, and the poles N, S of the magnets 5, 6 are aligned such that between these a magnetic field B arises antiparallel to the transport direction T. At the beginning of the arrangement of the magnets 3, 4 and magnets 5, 6, in this magnet arrangement, there is respectively formed a magnetic field which can lead to a preceding, additional magnetic reversal of the security element, which, however, has no influence on the magnetization of the security element that results after the magnetic field A or after the magnetic field B. The magnetic field strength of the magnetization section A is greater than the magnetic field strength of the magnetization section B, for example by a factor of at least 1.5 The magnetic fields A, B, alternatively, of course can also be generated with the aid of other types of magnets or with the aid of current-carrying electrical conductors. Instead of two opposing magnets, for making available the respective magnetic field A or B there can also be employed e.g. a single magnet which is disposed only on one side of the transported value document 1. The shown apparatus is contained in an apparatus for processing value documents, in which the value documents 1 are input singly or in stacks, then are checked, sorted and stored in the apparatus for processing value documents or again are output.

The value document 1 has a security element 2 with a magnetic coding. The security element 2 is configured e.g. as a security thread which contains along its longitudinal direction a first high-coercive magnetic region h, a low-coercive magnetic region l and a combined magnetic region k. Between these magnetic regions h, l, k there is located non-magnetic material. The high-coercive and the low-coercive magnetic material of the combined magnetic region k have approximately the same remanent flux density. The combined magnet region k contains the two magnetic materials disposed on each other or as a mixture.

The first magnetic field A is oriented parallel to the transport direction T of the value document 1 and has a great magnetic field strength which is greater than the coercive field strengths of both magnetic materials of the security element 2. By the first magnetic field A both the high-coercive and the low-coercive magnetic material is aligned in a first magnetization direction which in this example is oriented parallel to the transport direction T of the value document 1 (x-direction). Therefore, the magnetic field A aligns the magnetization of the high-coercive magnetic region h as well as that of the low-coercive magnetic region l as well as that of the combined magnetic region k of the security element 2 in the x-direction. The second magnetic field B is oriented antiparallel to the transport direction T of the value document 1 and has a lower magnetic field strength which lies between the coercive field strengths of the high- and of the low-coercive magnetic material of the security element 2. The second magnetic field B magnetically reverses only the low-coercive magnetic material, namely in a second magnetization direction which is oriented antiparallel to the first magnetization direction, i.e. antiparallel to the transport direction T (-x-direction). The magnetization of the high-coercive magnetic material remains uninfluenced by the second magnetic field B, and thus aligned in the first magnetization direction. Therefore, the magnetic field B changes only the magnetization of the low-coercive magnetic region l and that of the combined magnetic region k. The magnetization of the low-coercive magnetic material l is aligned antiparallel to the first magnetization direction (-x-direction) by the second magnetic field B. The magnetization of the combined magnetic region k results from the sum of the magnetizations of the high-coercive proportion and of the low-coercive proportion of the combined magnetic region k. When these two proportions of the combined magnetic region have approximately the same remanent flux density, their magnetizations cancel each other out. The magnetic field B thus effects that the resulting magnetization of the combined magnet region k almost vanishes.

Instead of the magnetic field directions of FIG. 1, it is likewise possible to make available the magnetic field A antiparallel to the transport direction and the magnetic field B parallel to the transport direction.

After the first and second magnetization, the value document 1 is transported past the magnetic sensor 10, which can be installed in the apparatus for processing value documents neighboring to or spatially separated from the arrangement 20. There between, there can be provided e.g. branchings or diversions of the transport path S. The magnetic sensor 10 contains two sensor lines 12, 14 which each have a plurality of magneto-sensitive elements 13, 15 of the same type which are disposed in a line. Each of these magneto-sensitive elements 13, 15 supplies a magnetic signal, so that in this example a plurality of first magnetic signals M1 are detected with the aid of the magneto-sensitive elements 13 and a plurality of second magnetic signals M2 with the aid of the magneto-sensitive elements 15. Each element 13 of the first sensor line 12 captures the same section of the transported security element 2 as an element 15 of the second sensor line 14 corresponding thereto. Respectively the magnetic signals of two elements 13, 15 corresponding to each other supply the first and second magnetic signal of a certain section of the security element 2.

During the detection of the first magnetic signals, the security element 2 is not subjected to a magnetic field. The magneto-sensitive elements 15 of the second sensor line 14 detect the second magnetic signals of the security element 2 under the action of a third magnetic field C, which acts on the security element 2 before and during the detection of the second magnetic signals. The third magnetic field C is made available by a magnet 8 disposed one-sided to the transport path S and extends in such a way that it magnetizes the security element 2 already before this comes into the capture region of the second sensor line 14. The detection of the second magnetic signals M2 under the action of the third magnetic field C has the advantage that the second sensor line 14 can be employed not only for detecting the different magnetic regions h, l, k of the security element 2, but that this can also detect magnetic signals of soft-magnetic regions l1 which can be present outside the security element 2 on the value document, cf. FIG. 1. The third magnetic field C has a magnetic field strength which lies between the coercive field strengths of the high-coercive and of the low-coercive magnetic material. The magnetization of the low-coercive magnetic region and of the low-coercive proportion of the combined magnetic region k are therefore aligned in the third magnetization direction, which differs from the second magnetization direction. The magnetization of the high-coercive magnetic region h and of the high-coercive proportion of the combined magnetic region k remain uninfluenced by the third magnetic field C. The third magnetic field C effects altogether a resulting magnetization of the combined magnetic region k, whose direction differs from the second magnetization direction. In the example of FIG. 1, the third magnetic field C is oriented perpendicular to the transport plane of the value document 1 (z-direction), but also other directions can be selected, which differ from that of the second magnetic field B, e.g. the y-direction or other directions.

The sensor lines 12, 14 are disposed in close proximity to the transport plane of the value document 1. It can be provided that the value documents 1 transported past contact the surface of the sensor lines 12, 14, but there can also be provided a small distance between the surface of the sensor lines 12, 14 and the transported value document 1, e.g. a distance in the mm-range. The magneto-sensitive elements 13 and 15 e.g. are respectively disposed on a common circuit board (wiring of the circuit boards not shown), and connected with a signal processing device 9, which processes further the magnetic signals of the elements 13, 15. The circuit board of the sensor line 14 having the magneto-sensitive elements 15 and the magnet 8 are fixed to each other mechanically by potting, so that they form a structural unit. The signal processing device 9 receives magnetic signals from the two sensor lines 12, 14 and processes and analyzes these. The signal processing device 9 can be disposed e.g. together with the sensor lines 12, 14 in the same housing. Via an interface data can be sent outward from the signal processing device 9, e.g. to a device which processes further the data and/or to a display device which informs about the result of the check of the value document.

FIG. 2a shows a further embodiment in a plan view of the transport plane (x-y). The security element 2 of the value document 1, which has been magnetized in the manner described above by the magnetic fields A, B, is transported past the two sensor lines 12, 14 which record the first and second magnetic signals. Like in FIG. 1, also in this embodiment the first magnetic field A is oriented parallel to the transport direction (x), the second magnetic field B antiparallel thereto (−x) and the third magnetic field C perpendicular to the transport plane of the value document 1 (z). The magneto-sensitive elements 13, 15 of the first and of the second sensor line 12, 14 have main sensitivity directions H1 and H2 which are drawn in FIG. 2 by arrows on the respective magneto-sensitive elements 13 and 15. For example, the main sensitivity direction H1, H2 of the magneto-sensitive elements 13, 15 are oriented equal and parallel to the magnetic field A. The magneto-sensitive elements 13 detect first magnetic signals M1 without the action of a magnetic field on the security element. The magneto-sensitive elements 15 detect second magnetic signals M2 after and under the action of the third magnetic field C on the security element. The magnetic signals of the sensor lines 12, 14 are relayed to a signal processing device (not shown) which processes these.

In FIG. 2b there are represented the first and second magnetic signals M1, M2 of a high-coercive magnetic region h (FIG. 2b at the top), of a low-coercive magnetic region l (FIG. 2b center) and of a combined magnetic region k (FIG. 2b bottom) relative to the respective signal offset N1 or N2. Upon transport of the security element 2 past the sensor lines 12, 14, a high-coercive magnetic region h generates at a magneto-sensitive element 13 of the first sensor line 12 the first magnetic signal M1 designated with h, and at a magneto-sensitive element 15 of the second sensor line 14 corresponding thereto the second magnetic signal M2 designated with h. Both magnetic signals are approximately equal and lie above a first or second upper threshold O1, O2. A low-coercive magnetic region l generates at a magneto-sensitive element 13 of the first sensor line 12 the first magnetic signal M1 designated with l, which undershoots a first lower threshold U1. An element 15 of the second sensor line 14 corresponding thereto detects the second magnetic signal M2 designated with l, which exceeds the second upper threshold O2 as well as undershoots the second lower threshold U2. Already on the basis of the first magnetic signal M1, therefore, high-coercive and low-coercive magnetic regions of the security element 2 can be uniquely distinguished from each other.

A combined magnetic region k, however, generates at a magneto-sensitive element 13, due to the antiparallel alignment of its high- and low-coercive proportion, only a negligibly low first magnetic signal M1, cf. FIG. 2b bottom left. Since the magnetization of the combined magnetic region k is changed by the third magnetic field C, this combined magnetic region generates at a magneto-sensitive element 15 of the second sensor line 14, however, a distinct second magnetic signal M2, which exceeds the second upper threshold O2, cf. FIG. 2b bottom right. The presence of a combined magnetic region k can thus be recognized from the fact that in a section along the security element 2 a distinct second magnetic signal M2 is detected, but the first magnetic signal M1 in this section is very low, e.g. reaches neither of the two first thresholds U1, O1. Thus, a combined magnetic region k can be uniquely distinguished from the high- and low-coercive regions of the security element.

Figure 3A:
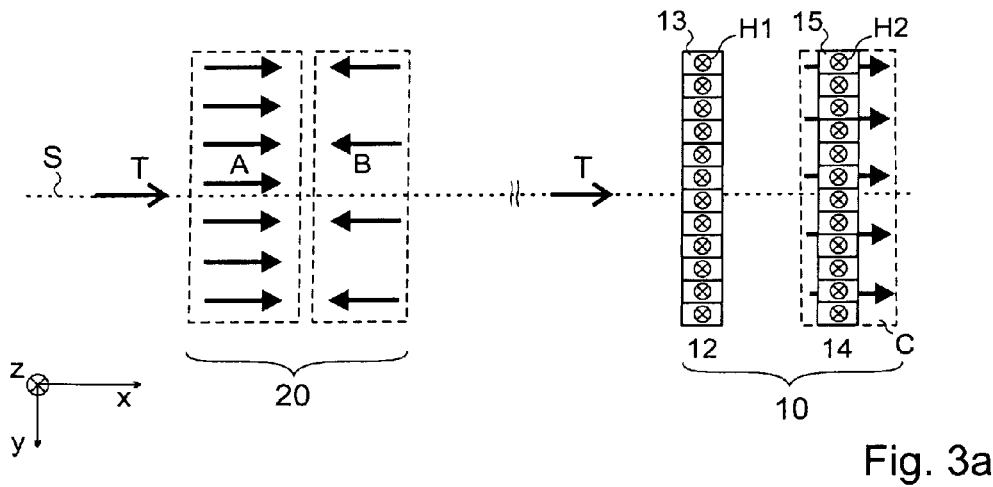

FIG. 3a shows a further embodiment with magnetic fields A, B corresponding to FIG. 2a. The first and second magnetic detectors in this example consist of respectively one sensor line 12 or 14, whose magneto-sensitive elements 13, 15 have main sensitivity directions H1, H2, which are oriented perpendicular to the transport plane of the value document 1 (z-direction).

Figure 3B:
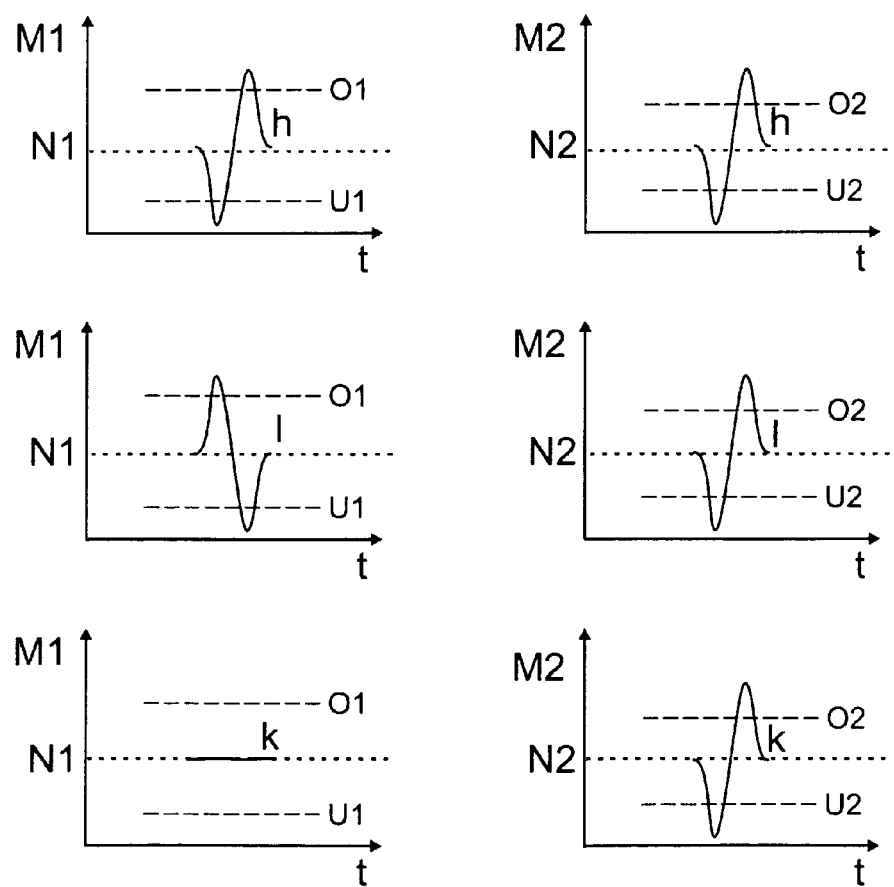

The direction of the third magnetic field C in this example is oriented parallel to the transport plane T of the value document 1. The magnet for making available the third magnetic field can be e.g. a horseshoe magnet disposed one-sided to the transport path S, in the symmetry plane of which there is positioned the sensor line 14. The magnetic signals of the sensor lines 12, 14 are relayed to a signal processing device (not shown), which processes further the first and second magnetic signals. In comparison to the example of FIG. 2a, due to the changed main sensitivity directions H1, H2 and the changed direction of the third magnetic field C, there also arise different first and second magnetic signals M1, M2, cf. FIG. 3b. The first and second magnetic signals of a high-coercive magnetic region h both exceed the respective upper threshold O1 or O2 and both undershoot the respective lower threshold U1 or U2, cf. FIG. 3b at the top. A low-coercive magnetic region l also supplies first and second magnetic signals, which both exceed upper thresholds O1 or O2 and both undershoot lower thresholds U1 or U2. While the second magnetic signals M2 of the high- and low-coercive magnetic regions h, l are approximately equal, the first magnetic signal M1 of the low-coercive magnetic region l has a signal form inverse thereto, cf. FIG. 3b center left. The low-coercive magnetic region l can therefore be distinguished from the high-coercive magnetic regions h with the aid of the signal form of its first magnetic signal M1. A combined magnetic region k generates, due to the antiparallel alignment of its high- and low-coercive proportion, again only a negligibly low first magnetic signal M1, cf. FIG. 3b bottom left. Since also in this example the magnetization of the combined magnetic region k is changed by the third magnetic field C, this generates, however, a distinct second magnetic signal M2, which exceeds the second upper threshold O2 and undershoots the second lower threshold, cf. FIG. 3b bottom right. The presence of a combined magnetic region k can thus be recognized, also in this example, from the fact that in a section along the security element 2 a distinct second magnetic signal M2 is detected, but the first magnetic signal M1 in this section is very low, e.g. reaches neither of the two first thresholds U1, O1.

Figure 4A:
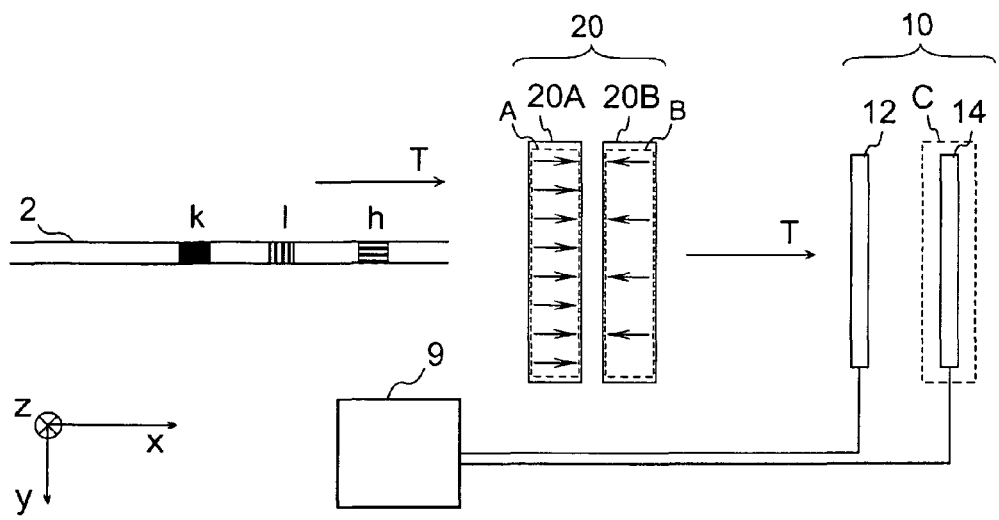

In FIG. 4a there is outlined a further embodiment of an apparatus for checking a value document 1, in which a value document (not shown), which contains a security element 2, is transported along a transport direction T past the apparatus. The apparatus is configured to check a security element 2 whose longitudinal direction extends parallel to the transport direction T of the value document. The apparatus has an arrangement 20 of two magnetization devices 20A, 20B, which make available a first magnetic field A parallel and a second magnetic field B antiparallel to the transport direction T of the value document. The apparatus also contains a first magnetic detector 12 and a second magnetic detector 14 which, upon viewing in transport direction T, both are disposed downstream of the magnetization devices 20A, 20B. The two magnetic detectors 12, 14 are oriented perpendicular to the longitudinal direction of the security element 2 and respectively possess only one single magneto-sensitive element which is configured at least to detect magnetic fields parallel and antiparallel to the transport direction T. As in the previous embodiments, the first magnetic detector 12 detects first magnetic signals M1 without the action of a magnetic field, and the second magnetic detector 14 detects second magnetic signals M2 after and under the action of a third magnetic field C on the security element 2. The apparatus has further a signal processing device 9 which is connected with the first and the second magnetic detector 12, 14. In contrast to the preceding examples, the first magnetic signals M1 as well as the second magnetic signals M2 of the different magnetic regions h, l, k of the security element 2 in this example are respectively detected in temporal succession. Depending on the direction of the third magnetic field C and depending on the sensitivity direction of the magnetic detectors 12, 14, there may result first and second magnetic signals here, which are comparable with the ones of the FIGS. 2b and 3b and can be evaluated analogous thereto.

Figure 4B:
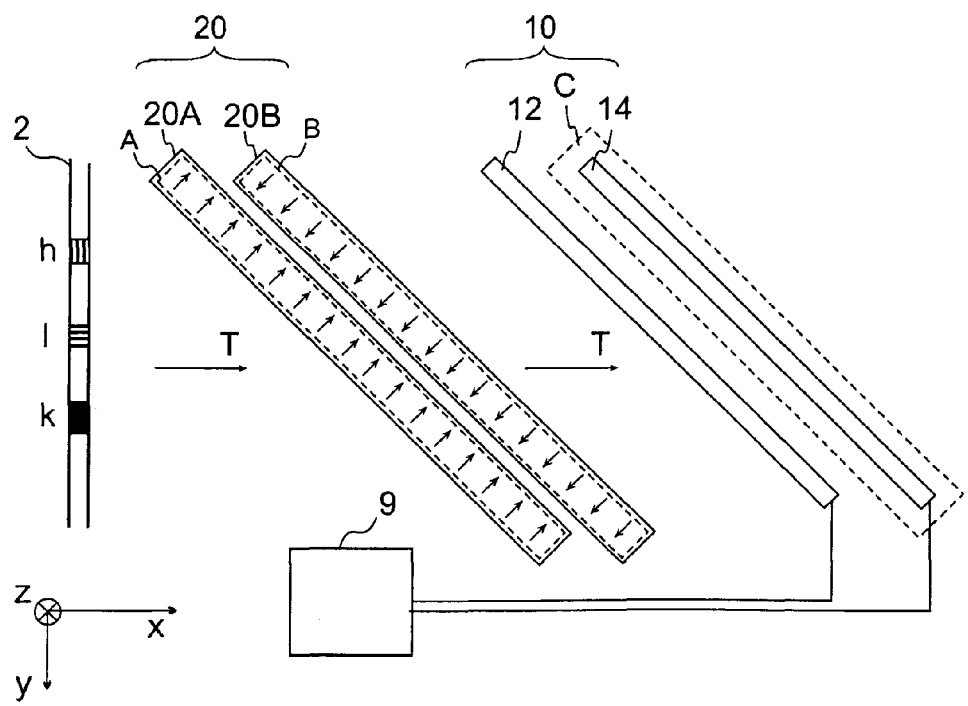

FIG. 4b shows a further embodiment which largely corresponds to the embodiment of FIG. 4a. In contrast thereto, in this embodiment the magnetic detectors 12, 14 and the magnetization devices 20A, 20B, however, are oriented obliquely to the transport direction T of the security element 2. Through the oblique position, a spatial resolution can be achieved even without the use of elaborate sensor lines. The two magneto-sensitive elements of the magnetic detectors 12, 14 detect the first and the second magnetic signals of the different magnetic regions h, l, k analogous to the example of FIG. 4a, respectively in temporal succession.

The invention claimed is:

1. A method for checking a value document having a security element with several magnetic regions, said magnetic regions having at least one high-coercive magnetic region which contains a high-coercive magnetic material with a first coercive field strength and at least one low-coercive magnetic region which contains a low-coercive magnetic material with a second coercive field strength which is lower than the first coercive field strength and at least one combined magnetic region which contains both the high-coercive and the low-coercive magnetic material, comprising the steps:

first, magnetizing the security element by a first magnetic field whose magnetic field strength is greater than the first coercive field strength, so that the magnetization of the high-coercive magnetic material and the magnetization of the low-coercive magnetic material are aligned in a first magnetization direction, then, magnetizing the security element by a second magnetic field whose magnetic field strength is lower than the first coercive field strength but is greater than the second coercive field strength, the second magnetic field being oriented such that the magnetization of the low-coercive magnetic material through the second magnetizing is aligned antiparallel to the first magnetization direction, detecting first magnetic signals of the security element by a first magnetic detector, and detecting second magnetic signals of the security element by a second magnetic detector, before the detection of the second magnetic signals a third magnetic field acting on the security element, wherein the magnetic field strength of the third magnetic field is greater than the second coercive field strength and the third magnetic field is oriented such that the magnetization of the low-coercive magnetic material is aligned by the third magnetic field in a third magnetization direction which is oriented non-antiparallel to the first magnetization direction.

2. The method according to claim 1, wherein the second magnetic signals of the security element are detected under the action of the third magnetic field.

3. The method according to claim 1, wherein by the second magnetic detector second magnetic signals of one or several soft-magnetic regions of the value document are detected, and are disposed outside the security element; and causing the third magnetic field to act on the soft-magnetic region during the detection of the second magnetic signal of the respective soft-magnetic region.

4. The method according to claim 1, wherein the at least one combined magnetic region is magnetized by the second magnetic field such that a resulting magnetization of the at least one combined magnetic region, which arises from the second magnetizing, at least approximatively vanishes.

5. The method according to claim 1, wherein the at least one combined magnetic region is configured such that the high-coercive magnetic material of the combined magnetic region and the low-coercive magnetic material of the combined magnetic region have substantially the same remanent flux density.

6. The method according to claim 1, wherein a magnetic region whose second magnetic signal exceeds a second upper threshold and/or undershoots a second lower threshold, and whose first magnetic signal neither exceeds a first upper threshold nor undershoots a first lower threshold, is identified as a combined magnetic region.

7. The method according to claim 6, wherein the first magnetic signal of the security element has a first signal offset and that the first upper threshold lies above the first signal offset and the first lower threshold lies below the first signal offset.

8. The method according to claim 1, wherein a magnetic region whose second magnetic signal exceeds the second upper threshold and/or undershoots the second lower threshold, and whose first magnetic signal exceeds at least one of the first upper threshold and undershoots the first lower threshold, is identified either as high-coercive or as low-coercive magnetic region.

9. A method for checking a value document having a security element with several magnetic region, said magnetic regions having at least one high-coercive magnetic region which contains a high-coercive magnetic material with a first coercive field strength and at least one low-coercive magnetic region which contains a low-coercive magnetic material with a second coercive field strength which is lower than the first coercive field strength and at least one combined magnetic region which contains both the high-coercive and the low-coercive magnetic material, comprising the steps:

first, magnetizing the security element by a first magnetic field whose magnetic field strength is greater than the first coercive field strength, so that the magnetization of the high-coercive magnetic material and the magnetization of the low-coercive magnetic material are aligned in a first magnetization direction, then, magnetizing the security element by a second magnetic field whose magnetic field strength is lower than the first coercive field strength but is greater than the second coercive field strength, the second magnetic field being oriented such that the magnetization of the low-coercive magnetic material through the second magnetizing is aligned antiparallel to the first magnetization direction, detecting first magnetic signals of the security element by a first magnetic detector, and detecting second magnetic signals of the security element by a second magnetic detector, before the detection of the second magnetic signals a third magnetic field acting on the security element, wherein a magnetic region whose second magnetic signal exceeds a second upper threshold and/or undershoots a second lower threshold, and whose first magnetic signal neither exceeds a first upper threshold nor undershoots a first lower threshold, is identified as a combined magnetic region, and wherein the first magnetic signal of the security element has a first signal offset and that the first upper threshold lies above the first signal offset and the first lower threshold lies below the first signal offset.

10. An apparatus for checking a document of value which has a security element with high-coercive magnetic material of a first coercive field strength and with low-coercive magnetic material of a second coercive field strength, wherein the apparatus comprises successively along a transport direction of the value document:

a first magnetization device arranged to make available a first magnetic field which is configured for the first magnetizing of the high-coercive and of the low-coercive magnetic material in a first magnetization direction, the magnetic field strength employed for the first magnetizing being greater than the first coercive field strength, a second magnetization device arranged to make available a second magnetic field which is configured for the second magnetizing of the low-coercive magnetic material in a second magnetization direction which is oriented antiparallel to the first magnetization direction, the magnetic field strength employed for the second magnetizing being lower than the first coercive field strength, but greater than the second coercive field strength, and a first magnetic detector arranged to detect first magnetic signals of the security element, a second magnetic detector arranged to detect second magnetic signals of the security element, and a third magnetization device arranged to make available a third magnetic field, which is configured such that the third magnetic field, upon checking of the value document, acts on the security element before the detection of the second magnetic signals, wherein the magnetic field strength of the third magnetic field is greater than the second coercive field strength and the third magnetic field is oriented such that the magnetization of the low-coercive magnetic material is aligned by the third magnetic field in a third magnetization direction which is oriented non-antiparallel to the first magnetization direction.

11. The apparatus according to claim 10, wherein the third magnetic field is configured such that, upon checking of the value document, it acts on a section of the security element to be detected, after the detection of the first magnetic signal of the respective section and before the detection of the second magnetic signal of the respective section.

12. The apparatus according to claim 11, wherein the third magnetic field is configured such that it acts on the section of the security element to be detected, before and during the detection of the second magnetic signal of the respective section.

13. The apparatus according to claim 10, wherein the third magnetic field is oriented substantially perpendicular to a main sensitivity direction of the second magnetic detector.

14. The apparatus according to claim 10, wherein the first magnetization direction is oriented parallel or antiparallel to the transport direction of the value document.

* * * * *